United States Patent
Zhu et al.

(10) Patent No.: US 10,136,336 B2
(45) Date of Patent: Nov. 20, 2018

(54) BASE STATION AND METHOD THEREOF

(71) Applicant: Telefonaktiebolaget L M Ericsson (publ), Stockholm (SE)

(72) Inventors: Huaisong Zhu, Beijing (CN); Yang Hu, Beijing (CN); Xinghua Song, Beijing (CN)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 121 days.

(21) Appl. No.: 14/652,279

(22) PCT Filed: Dec. 18, 2012

(86) PCT No.: PCT/CN2012/086837
§ 371 (c)(1),
(2) Date: Jun. 15, 2015

(87) PCT Pub. No.: WO2014/094231
PCT Pub. Date: Jun. 26, 2014

(65) Prior Publication Data
US 2015/0327078 A1    Nov. 12, 2015

(51) Int. Cl.
*H04W 16/28* (2009.01)
*H04W 24/02* (2009.01)

(52) U.S. Cl.
CPC ............ *H04W 16/28* (2013.01); *H04W 24/02* (2013.01); *Y02D 70/1242* (2018.01); *Y02D 70/1262* (2018.01)

(58) Field of Classification Search
None
See application file for complete search history.

(56) References Cited

U.S. PATENT DOCUMENTS 6,101,399 A * 8/2000 Raleigh ............... H01Q 3/2605
342/367
6,104,930 A * 8/2000 Ward ..................... H04W 16/28
455/450

(Continued)

FOREIGN PATENT DOCUMENTS

| CN | 102111773 | 6/2011 |
| CN | 102378205 | 3/2012 |

(Continued)

OTHER PUBLICATIONS

Juergen Carstens et al.; titled "Dynamic Hotspot Management with RET Antennas for UMTS Core and Extension Bands", presented in ip.com Journal: vol. 4 Issue 7 (Jul. 25, 2004), and is the product of Siemens AG 2004, Germany.*

(Continued)

*Primary Examiner* — Ayaz R Sheikh
*Assistant Examiner* — Tarell A Hampton
(74) *Attorney, Agent, or Firm* — Baker Botts, LLP

(57) ABSTRACT

There is provided a base station (BS) (1000) and a method at the BS that is capable of enhancing network capacity with low transmission power in a radio network. The method comprises serving a cell with one or more first carriers. The method further comprises serving a hot-spot within the cell with one or more beam-formed second carriers, wherein the first and second carriers share a total transmission power for serving the cell. Beam-forming based hot-spot carriers can efficiently save transmission power and contribute to the total power utilization efficiency. The base station (1000) thus can meet the capacity enhancement requirement with low transmission power.

18 Claims, 6 Drawing Sheets

(56) References Cited

U.S. PATENT DOCUMENTS

| | | | |
|---|---|---|---|
| 7,573,857 B1* | 8/2009 | Radhakrishnan | H04W 48/20 370/336 |
| 8,804,631 B2* | 8/2014 | Fu | H04L 5/0007 370/329 |
| 2002/0045428 A1* | 4/2002 | Chesson | H04W 52/346 455/127.1 |
| 2004/0157646 A1* | 8/2004 | Raleigh | H01Q 3/2605 455/562.1 |
| 2005/0027472 A1 | 2/2005 | Kim | |
| 2005/0192058 A1* | 9/2005 | Jung | H04W 16/28 455/562.1 |
| 2005/0272472 A1* | 12/2005 | Goldberg | H04W 16/28 455/562.1 |
| 2008/0102834 A1* | 5/2008 | Bernhard | H04W 36/24 455/436 |
| 2010/0105336 A1* | 4/2010 | Attar | H04W 72/02 455/67.11 |
| 2011/0105141 A1* | 5/2011 | Jung | H04W 68/00 455/453 |
| 2011/0268029 A1* | 11/2011 | Tseng | H04L 5/003 370/328 |
| 2011/0306383 A1* | 12/2011 | Lee, II | H04B 7/0691 455/522 |
| 2012/0106442 A1* | 5/2012 | Xiao | H04L 5/001 370/328 |
| 2012/0127931 A1* | 5/2012 | Gaal | H04L 1/1861 370/329 |
| 2012/0276937 A1* | 11/2012 | Astely | H04W 72/082 455/501 |
| 2013/0034050 A1* | 2/2013 | Ros | H04B 7/185 370/316 |
| 2013/0171998 A1* | 7/2013 | Liu | H04W 16/28 455/446 |
| 2013/0188552 A1* | 7/2013 | Kazmi | H04L 5/001 370/315 |
| 2013/0331136 A1* | 12/2013 | Yang | H04B 7/024 455/501 |
| 2016/0112881 A1* | 4/2016 | Duan | H04L 43/16 455/422.1 |

FOREIGN PATENT DOCUMENTS

| | | | |
|---|---|---|---|
| CN | 101095333 A | 12/2017 | |
| EP | 0876074 A1 * | 11/1998 | H04W 16/28 |
| WO | WO 2012/146313 | 11/2012 | |

OTHER PUBLICATIONS

PCT Notification of Transmittal of the International Search Report and the Written Opinion of the International Searching Authority, or the Declaration for International application No. PCT/CN2012/086837, dated Oct. 10, 2013.

3GPP TS 36.331 V9.2.0; 3rd Generation Partnership Project; Technical Specification Group Radio Access Network; Evolved Universal Terrestrial Radio Access (E-UTRA); Radio Resource Control (RRC); Protocol specification (Release 9), Mar. 2010.

3GPP TS 36.211 V8.7.0; 3rd Generation Partnership Project; Technical Specification Group Radio Access Network; Evolved Universal Terrestrial Radio Access (E-UTRA); Physical Channels and Modulation (Release 8), May 2009.

EPO issued extended European Search Report for Application No. / U.S. Pat. No. 12890268.1-1857 / 2936866 PCT/CN2012086837—dated Jun. 22, 2016.

3GPP TSG RAN WG1 Meeting #69; Prague, Czech Republic; Title: On Spatial Diversity for E-PDCCH; Source: Research in Motion, UK Limited (R1-122722)—May 21-25, 2012.

Communication Pursuant to Article 94(3) EPC for Application No. 12 890 268.1-1857—Mar. 30, 2017.

Communication Pursuant to Article 94(3) EPC issued by the European Patent Office for Application No. 12 268.1-1857—Oct. 4, 2017 890.

Chinese Office Action Issued for Application No. 2018011901511560 (English language summary attached)—dated Jan. 24, 2018.

* cited by examiner

BASE STATION AND METHOD THEREOF

PRIORITY

This nonprovisional application is a U.S. National Stage Filing under 35 U.S.C. § 371 of International Patent Application Serial No. PCT/CN2012/086837, filed Dec. 18, 2012, and entitled "BASE STATION AND METHOD THEREOF."

TECHNICAL FIELD

The present disclosure relates to the field of radio network, and more particularly, to a Base Station (BS) and a method thereof that is capable of enhancing network capacity with low transmission power in a radio network.

BACKGROUND

For an operator, the first step to rollout a radio network is to build macro BSs to guarantee basic coverage. There is normally no high capacity requirement at the initial rollout phase. When the network evolves, however, more and more User Equipments (UEs) will be served by the network. Capacity extension will be required for some BSs. There are in general three main solutions as listed below to improve macro deployment with capturing capacity demand. FIG. 1 shows a schematic diagram of the three solutions.

Improve Macro

Improve macro capacity by for example adding more carriers. This method is normally the cheapest solution for those operators who have enough radio bandwidth resources, since there is no requirement for more sites as compared to the Densify Macro solution discussed below. Hence Capital Operating Expense (COPEX) increases not too much. For example, for CMCC, there is currently 50 MHz bandwidth for a TD LTE network rollout. Therefore, adding multiple carriers used for macro base station capacity improvement is a good choice for CMCC.

Advantage: it is cheap if the operator has enough radio resources.

Disadvantage: large radio bandwidth resources are needed.

Densify Macro

Increase the number of macro BSs for a certain area with smaller Inter-Site Distance (ISD). In the solution, time-frequency resources can be reused in spatial domain with more macro BSs deployed. However, this leads to more COPEX for operators since operators need to find more sites to deploy BSs and more BSs to be deployed. The solution also brings a challenge in network optimization.

Advantage: Do not need large radio bandwidth resources.

Disadvantage: COPEX is highest among the three solutions.

Add Small Cells

This method can be viewed as an enhancement of the Densify Macro solution, namely heterogeneous network deployment, where Pico BSs with a lower transmission power are dedicated to providing services for hot-spots on top of Marco deployment. Similarly as the Densify Macro solution above, it also increases the number of BSs to be deployed. It is thus an expensive solution especially compared with the Improve Macro solution. The BSs deployed have a lower transmission power, and thus the solution has a lower COPEX compared with the Densify Macro solution. Furthermore, the performance of the solution is sensitive to whether the Pico BSs are correctly put to real hot-spot(s). Accordingly, the gain brought out by the solution may be low when the hot-spot changes as the UEs within the hot-spot move.

Advantage: Do not need large radio bandwidth resources.

Disadvantage: COPEX is relative high.

From the above outline, it can be seen that the Improve Macro solution is the most efficient way among the three solutions to improve network capacity, which can efficiently avoid the disadvantages of a high COPEX of the Densify Macro and Add Small Cells solutions.

In a radio network, UEs are moving around all the time. FIG. 2 shows a schematic diagram of the robustness of the three solutions in a UE movement scenario.

As can be seen from FIG. 2, the UEs can be well served as they move in the Improve Macro solution which adds more carriers to cover the whole cell. In the Densify Macro solution, more macro BSs are added to share and balance the load within the cell. However, some of the macro BSs may be overloaded since the UEs may converge at a position in the cell as they move. The Add Small Cells solution puts Pico BSs to serve hot-spots. When the UEs in the hot-spot move, the hot-spot moves or changes. As shown in FIG. 2, the hot-spot may move out of the coverage of the Pico BS deployed previously. Therefore, the Densify Macro and Add Small Cells solutions are not the efficient way to provide good enough services for moving UEs. The intended network capacity enhancement is not well satisfied for the two solutions in such moving scenarios.

In the Improve Macro solution, each carrier shall be allocated with the same power for covering the whole cell so that the network capacity enhancement obtained by adding more carriers is ensured even if the UEs move. FIG. 3 shows a schematic diagram of an Improve Macro solution where carriers are allocated with different power. Carriers shown in the dotted area are allocated with smaller power to serve the newly emerged UEs that are close to the BS. When the new UEs move away, the network capacity enhancement obtained by adding the carriers disappears. Allocating each carrier with the same power sufficient for covering the whole cell can avoid such case. However, ensuring multiple carriers with the same coverage of the whole cell will result in the inefficiency of the total transmission power, and increase the cost. For example, assume that 40 W for each carrier of 20 MHz bandwidth is required for macro coverage. If 3 carriers with 60 MHz bandwidth is to be supported in the Macro cell, 120 W output power is needed, which means:

Much higher component cost.

Larger RRU size and weighting due to heating requirement.

Lower power efficiency when the Macro BS stays in a low transmission power condition (for example in midnight, there is low load).

Therefore, there is still a need to effectively enhance network capacity with a relative low transmission power requirement.

SUMMARY

An objection of the present disclosure is to provide a BS and a method at the BS that is capable of enhancing network capacity with low transmission power in a radio network.

In an aspect of the disclosure, there is provided a method in a base station, comprising serving an area with one or more first carriers. The method further comprises serving a hot-spot within the area with one or more beam-formed second carriers, wherein the first and second carriers share a total transmission power for serving the area.

The first carriers are used to ensure the macro coverage while the second carriers can support the capacity enhancement requirement. The second carriers are capable of serving the hot-spot even if the hot-spot moves due to the directional capability of the beam-forming technique. The second carriers serve the hot-spot instead of the whole area, and thus they may be allocated with lower power than the first carriers, i.e., power lower than that required for covering the whole area. Therefore, an advantage with the method is to enhance network capacity with low transmission power.

In another aspect of the disclosure, there is provided a base station, comprising an area serving unit configured to serve an area with one or more first carriers and a hot-spot serving unit configured to serve a hot-spot within the area with one or more beam-formed second carriers. The base station further comprises a power allocation unit configured to allocate a total transmission power for serving the area among the first and second carriers.

The base station serves the area with the first carriers. For a hot-spot in the area, the second carriers are beam-formed to serve the hot-spot. The base station thus maintains the macro coverage while serving a hot-spot with low transmission power.

BRIEF DESCRIPTION OF THE DRAWINGS

The foregoing and other features of this disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings.

DETAILED DESCRIPTION OF EMBODIMENTS

Hereunder, the present disclosure will be described in accordance with the drawings. In the following description, some embodiments are used for the purpose of description only, which shall not be understood as any limitation to the present disclosure but the examples thereof.

Beam-Forming Technique

Beam-forming is a technique that gives rise to a virtual antenna pattern of a particular shape, by using a number of individual antenna elements that form part of the overall antenna array. The antenna pattern is typically shaped to give rise to a "beam" directed towards a particular user. This maximizes the antenna gain in this particular direction. In addition, the pattern of the beam may be shaped to guarantee minimum gain the direction of unintended users, which has the additional benefit of reducing interference in the network.

The beam formed by the antenna array may be expressed as $$f(\phi) = \sum_{\phi=0}^{360} \sum_{i=0}^{M-1} A_i e^{j(2\pi i d \sin \phi + \varphi_i)} \quad \text{(Equation 1)}$$

where $A_i$ is the vibration amplitude of antenna element i of the antenna array, M is the number of antenna elements, d is the distance between antenna elements, and $\varphi_i$ is the initial phase value of antenna element i.

The base station is configured to calculate the initial phase and vibration amplitude by which the antenna element should be driven, to give rise to a particular direction of antenna pattern. If the intended user or UE moves, the beam towards the user or UE may be adapted by adjusting the initial phase and amplitude to be applied to each antenna element.

Example 1

Figure 1:
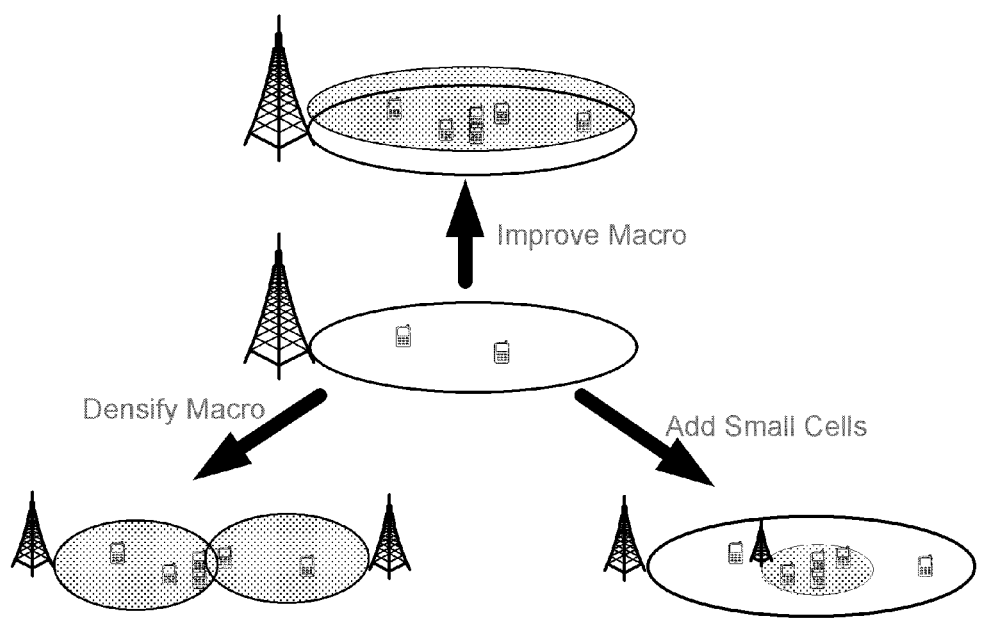
FIG. 1 shows a schematic diagram of the existing solutions for enhancing network capacity.
Figure 2:
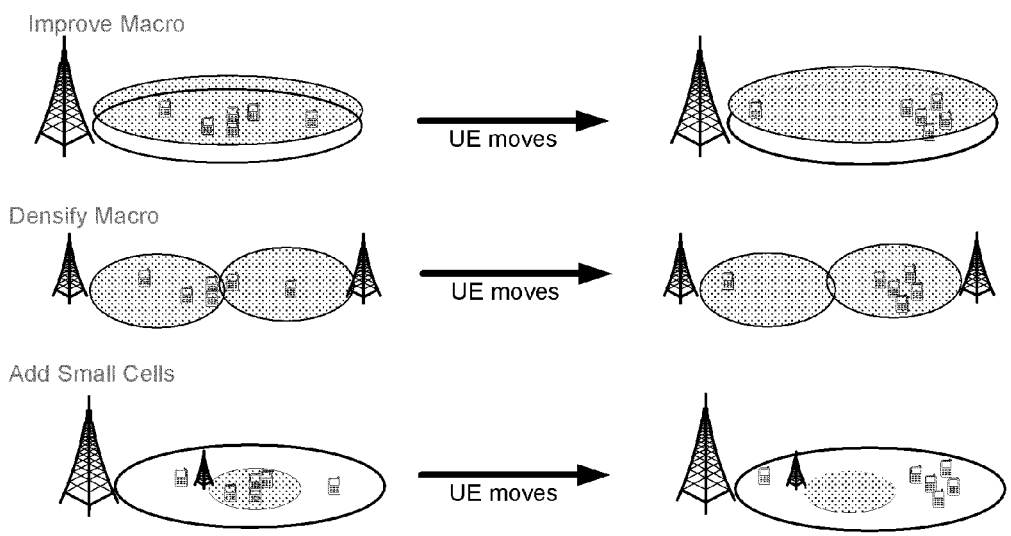
FIG. 2 shows a schematic diagram of the robustness of the existing solutions in a UE movement scenario.
Figure 3:
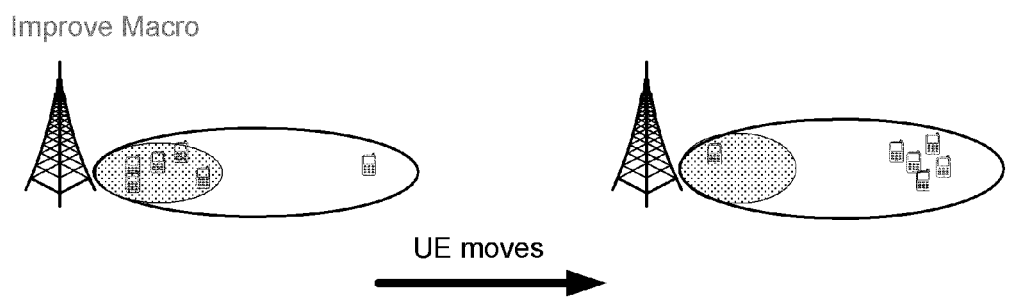
FIG. 3 shows a schematic diagram of an Improve Macro solution where carriers are allocated with different power.
Figure 4:
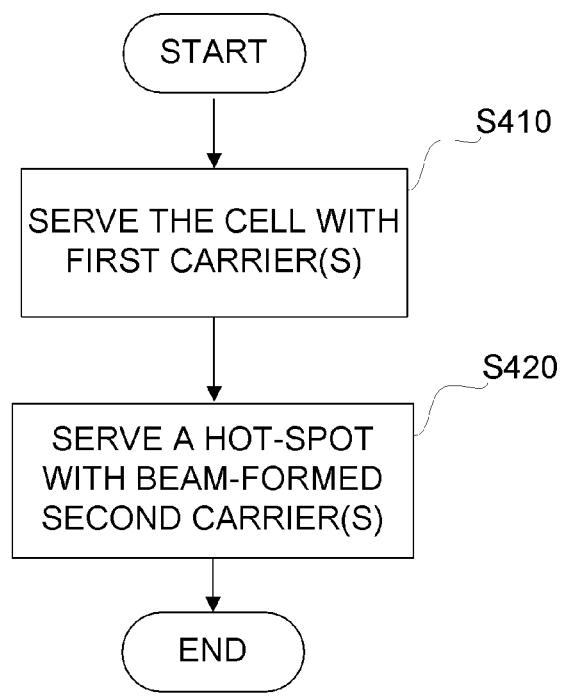
FIG. 4 is a flow chart of a method performed at a base station according to an embodiment of the present disclosure.

FIG. 4 is a flow chart of a method performed at a base station according to an embodiment of the present disclosure.

As shown in FIG. 4, the method starts at step S410 and comprises the base station serving an area (hereunder "cell") with one or more carriers (hereunder "first carriers"). If there is detected a hot-spot in the cell, the method further comprises serving the hot-spot with one or more carriers (hereunder "second carriers") at step S420. The first and second carriers share a total transmission power for serving the area or cell.

"Hot-spot" is used herein to refer the geographically regions of high traffic concentration in the cell. The UEs in the hot-spot may move around. Accordingly, hot-spot has two properties, i.e., direction and mobility. In the embodiment, beam-forming technique is applied to serve the hot-spot. The beam-forming technique can cover the two properties and thus well support the hot-spot.

The base station has sufficient bandwidth resource for serving the cell. The total bandwidth is divided into multiple carriers, where each of carriers may have different bandwidth. The number of carriers and bandwidth of each carrier is up to:

Hot-spot number.

The traffic demand of the cell coverage area and traffic demand of hot-spot. More traffic demand will require more carrier bandwidth.

For example, for a cell where there may be 2 hot-spots and traffic demand of the hot-spots occupy half of total traffic demand of the whole cell coverage area, the total 40 MHz bandwidth is divided into 3 carriers, one of 20 MHz for the cell coverage, and the other two of each 10 MHz for two hot-spots respectively. The base station is then configured to use the 20 MHz carrier as the first carrier to serve the cell, and configured to use one of the two 10 MHz carriers as the second carrier to serve the two hot-spots respectively. By adding the second carrier(s) that is dedicated to serving the hot-spot, the traffic congestion found in the hot-spot may be offloaded from the first carrier(s) having high traffic to the second carrier(s). Accordingly, the congestion problems caused by high traffic residing on macro cell in the radio network can be alleviated.

The bandwidth division between the cell coverage and the hot-spot may be further automatically adjusted/detected by OAM (Operation Administration and Maintenance) system from the statistic of traffic of the whole cell and the hot-spot. OAM systems will for example, log utilization percentage of each carrier or downlink throughput of each carrier. If it exceeds a predefined threshold, OAM will increase the bandwidth of carrier and vice verse. For example, when the traffic of a hot-spot decreases while the traffic of the cell increases, the carrier for the hot-spot may be allocated with less bandwidth while the carrier for the cell coverage may be allocated with more bandwidth.

The mechanism of determining the hot-spot number and traffic demand of the whole cell and the hot-spot may be configured by the operator in advance.

As described above, in the embodiment, the first carriers for the cell coverage and the second carriers for the hot-spot share the total transmission power of the base station.

The first carriers are used to guarantee the cell coverage. Following above example, assume $P_{coverage}$ of 40 W is needed for that 20 MHz coverage. If two or more carriers are assigned for cell coverage, each carrier has the same power and thus the same coverage. Accordingly, multiple of $P_{coverage}$ would be required. Basically, it should allocate the power for each carrier as same as single carrier case to reach same coverage. $P_{coverage}$ selection is the same as the conventional network configuration procedure, and can only be changed by operator because it represents the max network design coverage target of the whole cell.

The power of the second carriers, $P_{hot\text{-}spot}$, is determined according to the applied beam-forming technique. As said above, the base station is configured to calculate the initial phase and vibration amplitude by which the antenna element should be driven, to give rise to a particular direction. Accordingly, $P_{hot\text{-}spot}$ depends on the distance of the hot-spot relative to the base station or bandwidth of the respective carriers. More power may be needed if the hot-spot is far away from the base station. If the traffic of the hot-spot is heavy, more bandwidth is needed to serve the hot-spot, which in turns results in a larger amount of $P_{hot\text{-}spot}$.

The second carriers with $P_{hot\text{-}spot}$ are beam-formed to serve the hot-spot. Accordingly, the beam-forming is based on the attributes of the hot-spot. The attributes comprise at least one of the direction, location, distance and/or path loss of the hot-spot relative to the base station.

In the beam-forming technique, only UE specific channel of a certain UE is beam-formed. That is, some channels are maintained broadcasted in the cell, and only data channel of a specific UE is beam-formed to provide data traffic to the UE. In the present embodiments, the beam-forming technique is applied to the carrier(s) of the hot-spot instead. That is, the term "serving a hot-spot with beam-formed carriers" and the like used in the present disclosure means the entire carriers are beam-formed to cover the hot-spot. The beam formed by beam-forming technique changes as the hot-spot changes or moves, instead of a certain UE moves.

Figure 5:
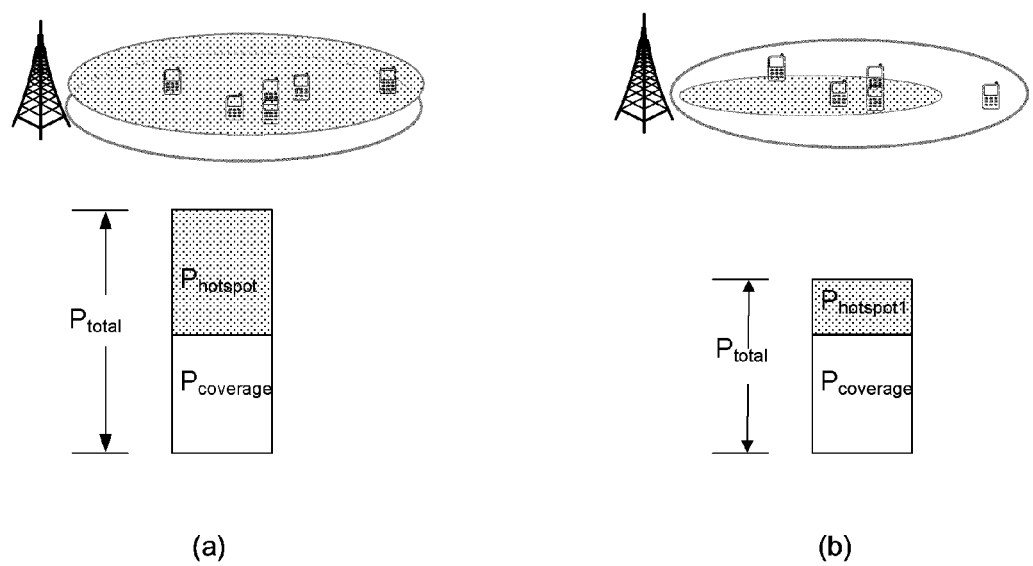
FIG. 5 shows a comparison diagram of the conventional Improve Macro solution and the method according to the present embodiments.

FIG. 5 shows a comparison diagram of the conventional Improve Macro solution and the method according to the present disclosure. The total transmission power $P_{total}$ is divided into $P_{coverage}$ for the cell coverage area and $P_{hotspot}$ for the hot-spot. As shown in FIG. 5(a), $P_{hotspot}$ is equal to $P_{coverage}$ in the conventional Improve Macro solution in the conventional method. $P_{hotspot}$ may be set to be lower than $P_{coverage}$ in the method according to the present embodiments, as shown in FIG. 5(b). Accordingly, the total transmission power can be lowered in the method according to the present disclosure while maintaining the network capacity enhancement.

In the embodiment, the area to be served is called a "cell." In a Universal Mobile Telecommunications System (UMTS) system, the term "cell" represents a geographical area. However, in a Long Term Evolution (LTE) system, the term "cell" is defined to be associated with the resource, such as bandwidth. There may exist a plurality of cells in a certain geographical area, each having a bandwidth. Some cell serves the whole area while some cell only serves a hot-spot. The embodiment according to the present disclosure is applicable to a LTE system by replacing the "cell" with "geographical area" in the embodiment. The cell used throughout the present disclosure represents a geographical area.

Example 2

Figure 6:
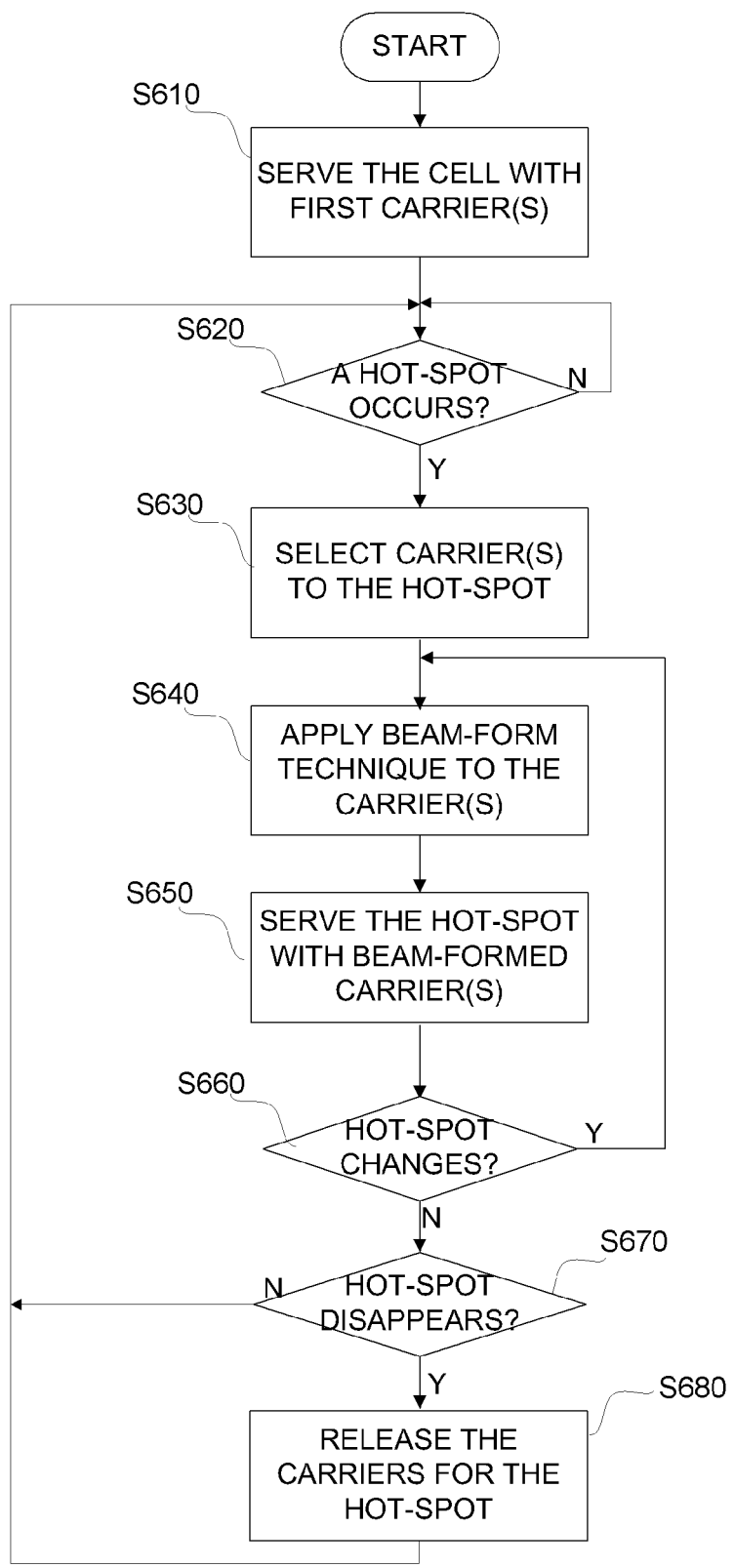
FIG. 6 is a flow chart of a method performed at a base station according to another embodiment of the present disclosure.

FIG. 6 is a flow chart of a method performed at a base station according to another embodiment of the present disclosure.

As shown in FIG. 6, the method starts and at step S610, the base station serving a cell with one or more first carriers. At step S620, it is detected whether a hot-spot occurs or is present.

It is observed that traffic intensity varies over time and locations. For example, for a cell having two office buildings and a block of residence, two hot-spot are present at the office buildings from 9:00 am to 5:00 pm, and a hot-spot is present at the block from 5:00 pm to the 9:00 am. Accordingly, the operator may store a hot-spot list, indicating the time and location of the hot-spots in the cell. The base station may look up the list to see whether a hot-spot will be present.

If a hot-spot is present, the method further comprises the base station selecting the carriers to be used for serving the hot-spot at step S630. For example, one of the 10 MHz carriers is selected. The base station may also determine the power allocated to the carriers. At step S640, the method further comprises the base station applying beam-forming technique to the selected carriers, and serving the detected hot-spot with the beam-formed carriers at step S650.

The hot-spot may move or changes as the UEs in the hot-spot move. Accordingly, the base station detects whether the hot-spot changes at step S660. The detection may be performed by monitoring the direction, location, distance and/or path loss of the hot-spot relative to the base station. For example, the base station may determine the direction of the hot-spot by measuring the uplink signal angle of arrive of all the UEs in the hot-spot. The distance of the hot-spot from the base station may be determined based on the uplink path loss or downlink path loss of each UE. The location of the hot-spot may be determined according to the statistics of the location of the UEs in the hot-spot.

When it is detected that the hot-spot changes, the method turns to step S640, where the carriers are re-beam-formed so as to focus the carriers' coverage on the changed hot-spot.

Figure 7:
FIG. 7 shows a diagram of hot-spot coverage before and after the hot-spot changes.

FIG. 7 shows a diagram of hot-spot coverage before and after the hot-spot changes. As shown, the beam-formed carriers cover the hot-spot well even when the UEs in the hot-spot move.

The base station detects whether the hot-spot disappears at step S670 (see FIG. 6). If no, the method turns to step S620 to detect a further hot-spot. If another hot-spot is present, the method further comprises the base station selecting one or more other/third beam-formed carriers for that hot-spot. For example, another one of the 10 MHz carriers can be selected. The one or more (first) carriers for the macro coverage, the one or more (second) carriers for the first hot-spot and the one or more (third) carriers for this further hot-spot share the total transmission power.

However, if it is detected that the hot-spot is absent at step S670, the one or more (third) carriers selected for that hot-spot are released at step S680. The method then turns to step S620 to detecting a new hot-spot. If another hot-spot is present, the base station selects carriers for that hot-spot. For example, the one of the 10 MHz carriers that was used can be selected again.

Figure 8:
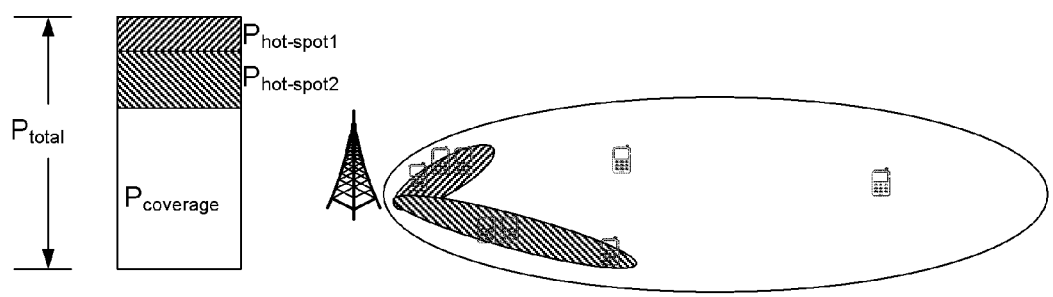
FIG. 8 shows a diagram of cell coverage where two hot-spots exist in the cell.

FIG. 8 shows a diagram of cell coverage where two hot-spots exist in the cell. The total transmission power used comprises that used for the two hot-spots and that used for cell coverage, i.e., $P_{total}=P_{hot-spot1}+P_{hot-spot2}\pm P_{coverage}$. Each of $P_{hot-spot1}$ and $P_{hot-spot2}$ is determined according to the respective hot-spots. $P_{hot-spot1}$ and $P_{hot-spot2}$ may be different and depend on, for example, geometrically-placed hotspots or bandwidth or some other methods. The detailed criterion is dependent on implementation. For the geometry based method, the rule is that the base station will allocate more power for the carrier of a hot-spot if the hot-spot is away from base station. To judge whether a hot-spot is away from base station or not, it can be operator-configurable or by some OAM system assistant measurement, where OAM collects UE measurement of down link path loss and analyzes the measurement to determine most of UEs in the hot-spot are away from or near the base station. For bandwidth based method, the rule is simple, i.e. more bandwidth, more power. As shown, $P_{hot-spot1}$ may be lower than $P_{hot-spot2}$ because hot-spot 1 is closer than hot-spot 2 to the base station. The total transmission power $P_{coverage}$ used according to the present embodiment is lower than that would otherwise be used for serving the same number of UEs in the conventional Improve Macro solution.

As said above, the operator may store a hot-spot list, and the base station may look up the list to see whether a hot-spot will be present. According to an embodiment, the method further comprises the base station detecting the hot-spot periodically. The period of detecting the hot-spot is set according to statistics of traffic in the cell. For the time that it has detected that the UEs move fast past days, for example the switching time from home to office, the period is set to tens of minutes. For the time that the UEs move slowly, e.g., the working hours, the period may be set to a longer period, e.g., an hour. The base station detects the hot-spot according to the set period.

Figure 9:
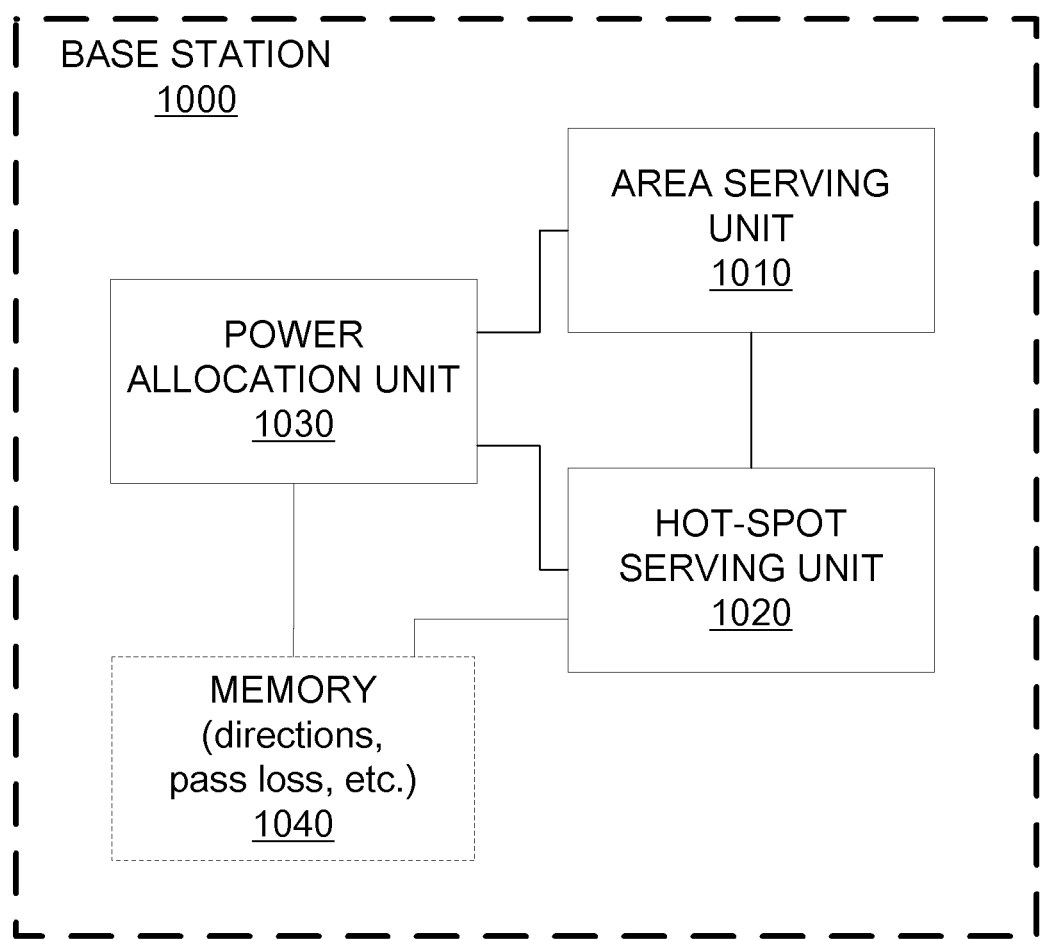
FIG. 9 is a diagram of a base station according to an embodiment of the present application.

FIG. 9 is a diagram of a base station according to an embodiment of the present application. As shown, the base station 1000 comprises a cell serving unit 1010 configured to serve a cell with one or more first carriers, a hot-spot serving unit 1020 configured to serve a hot-spot within the cell with one or more beam-formed second carriers, and a power allocation unit 1030 configured to allocate a total transmission power for serving the cell among the first and second carriers. The hot-spot serving unit 1020 may further comprises a hot-spot attribute determining unit configured to determine attributes of the hot-spot, and a beam-forming applying unit configured to apply a beam-forming technique to the one or more second carriers according to the determined attributes so as to serve the hot-spot. The different units may be comprised in a processing unit (not shown) connected to antennas and a memory.

Take the embodiment discussed in conjunction with FIG. 6 as an example, the cell serving unit 1010 uses some carriers to serve the whole cell. If a hot-spot is present in the cell, the power allocation unit 1030 selects carriers from the available carriers, and determines the power to be allocated to the carriers. The carriers for the cell coverage and the carriers for the hot-spot share the total transmission power. The hot-spot serving unit 1020 then uses the selected carriers to serve the hot-spot by the allocated power. If another hot-spot is present, the power allocation unit 1030 selects other carriers from the available carriers and determines the power to be allocated to the carriers. At this time, the carriers for the cell coverage, the carriers allocated to the first hot-spot and the carriers selected for this hot-spot share the total transmission power of the base station. The power allocation unit 1030 determines the power of the carriers used for hot-spot based on distance of the hot-spot relative to the base station or bandwidth of the respective carriers. When the hot-spot changes as the UEs within the hot-spot move, i.e., direction, location, distance or path loss of the hot-spot relative to the base station changes, the beam-forming applying unit re-beam-forms the carriers, so as to focus the carriers' coverage on the changed hot-spot. The base station may further comprises a memory 1040 for storing a hot-spot list, indicating the occurring time of the hot-spot and attributes of the hot-spot, such as the direction, location, distance or path loss of the hot-spot. The power allocation unit looks up the list to find parameters necessary for determining power of the carriers of the hot-spot. As an alternative, the parameters can be obtained by some OAM system assistant measurement.

In the present application, carriers are additionally provided to meet the capacity enhancement requirement. Comparing with the conventional solution where the carriers are allocated with power capable of cell coverage, the solution according to the present application allocates power necessary for hot-spot coverage to the added carriers. Beam-forming technique is used for the hot-spot carriers to cover the direction and mobility characteristic of the hot-spot. Generally, beam-forming based hot-spot carriers can efficiently save transmission power and contribute to the total power utilization efficiency. The base station thus can meet the capacity enhancement requirement with low transmission power.

The foregoing description gives only the exemplary embodiments of the present disclosure and is not intended to limit the present disclosure in any way. Thus, any modification, substitution, improvement or like made within the scope and principle of the present disclosure should be encompassed by the embodiments of the present disclosure.

What is claimed is:
1. A method in a base station, comprising:
serving an area with one or more first carriers;
serving a hot-spot within the area with one or more beam-formed second carriers,
wherein:
the first and second carriers share a total transmission power for serving the area;
the first and second carriers share a total bandwidth for serving the area; and the total bandwidth is allocated among the first carriers and the second carriers based on traffic demand of the area and traffic demand of the hot-spot.

2. The method according to claim 1, further comprising: serving a further hot-spot within the area with one or more beam-formed third carriers, wherein the first, second and third carriers share the total transmission power.

3. The method according to claim 1, wherein each of the one or more first carriers has an identical transmission power necessary for covering the area.

4. The method according to claim 1, wherein a transmission power of each of the one or more second carriers is determined based on distance of the hot-spot relative to the base station serving the area or bandwidth of the respective carriers.

5. The method according to claim 1, wherein the one or more second carriers are beam-formed based on attributes of the hot-spot to be served.

6. The method according to claim 5, wherein the attributes of the hot-spot comprises at least one of direction, location, distance and path loss of the hot-spot relative to a base station serving the area.

7. The method according to claim 1, wherein serving a hot-spot within the area further comprises: detecting a hot-spot within the area periodically.

8. The method according to claim 7, wherein the one or more second carriers are re-beam-formed when the hot-spot changes.

9. The method according to claim 7, wherein the period of detecting the hot-spot is set according to statistics of traffic in the area.

10. The method according to claim 1, further comprising: releasing the second carriers when the hot-spot is absent.

11. A base station, comprising:
a memory and one or more processing units;
the base station configured to:
serve an area with one or more first carriers;
serve a hot-spot within the area with one or more beam-formed second carriers, and
allocate a total transmission power for serving the area among the first and second carriers;
wherein:
the first and second carriers share a total transmission power for serving the area;
the first and second carriers share a total bandwidth for serving the area; and
the base station is further configured to allocate the total bandwidth among the first carriers and the second carriers based on traffic demand of the area and traffic demand of the hot-spot.

12. The base station according to claim 11, wherein
the base station is further configured to serve a further hot-spot within the area with one or more beam-formed third carriers, and
the base station is further configured to allocate the total transmission power among the first, second and third carriers.

13. The base station according to any claim 11, wherein each of the one or more first carriers is allocated with an identical transmission power necessary for covering the area.

14. The base station according to claim 11, wherein the base station is further configured to determine a transmission power of each of the one or more second carriers based on distance of the hot-spot relative to the base station or bandwidth of the respective carriers.

15. The base station according to claim 11, wherein the base station is further configured to:
determine attributes of the hot-spot; and
apply a beam-forming technique to the one or more second carriers according to the determined attributes so as to serve the hot-spot.

16. The base station according to claim 15, wherein the attributes of the hot-spot comprises at least one of direction, location, distance and path loss of the hot-spot relative to a base station serving the area.

17. The base station according to claim 11, wherein the base station is further configured to detect a hot-spot within the area periodically.

18. The base station according to claim 17, wherein the one or more second carriers are re-beam-formed when the hot-spot changes.

* * * * *